(12) United States Patent
Gruenig et al.

(10) Patent No.: US 9,975,430 B2
(45) Date of Patent: May 22, 2018

(54) POINTER INSTRUMENT HAVING A DOUBLE POINTER AND AN ECCENTRICALLY ARRANGED FASTENING COLUMN

(71) Applicant: CONTINENTAL AUTOMOTIVE GmbH, Hannover (DE)

(72) Inventors: Thomas Gruenig, Mönchweiler (DE); Rainer Stier, Rottweil (DE)

(73) Assignee: Continental Automotive GmbH, Hannover (DE)

( * ) Notice: Subject to any disclaimer, the term of this patent is extended or adjusted under 35 U.S.C. 154(b) by 205 days.

(21) Appl. No.: 15/028,673

(22) PCT Filed: Oct. 10, 2014

(86) PCT No.: PCT/EP2014/071803
§ 371 (c)(1),
(2) Date: Apr. 11, 2016

(87) PCT Pub. No.: WO2015/052327
PCT Pub. Date: Apr. 16, 2015

(65) Prior Publication Data
US 2016/0257200 A1 Sep. 8, 2016

(30) Foreign Application Priority Data

Oct. 11, 2013 (DE) .......................... 10 2013 220 510
Jan. 10, 2014 (DE) .......................... 10 2014 200 367

(51) Int. Cl.
*G01D 13/22* (2006.01)
*B60K 37/02* (2006.01)

(52) U.S. Cl.
CPC ............. *B60K 37/02* (2013.01); *G01D 13/22* (2013.01); *B60K 2350/403* (2013.01); *B60K 2350/408* (2013.01)

(58) Field of Classification Search
CPC ............. B60K 37/02; B60K 2350/403; B60K 2350/408; G01D 7/02; G01D 7/04; G01D 7/08; G01D 13/22
(Continued)

(56) References Cited

U.S. PATENT DOCUMENTS 3,364,748 A * 1/1968 Armstrong ................ G01L 7/00
116/301
3,997,777 A * 12/1976 Pucciarello ............ G01D 11/28
116/286
(Continued)

FOREIGN PATENT DOCUMENTS

DE 207023 2/1909
DE 196 01 270 7/1997
(Continued)

*Primary Examiner* — Richard A. Smith
(74) *Attorney, Agent, or Firm* — Cozen O'Connor

(57) ABSTRACT

A pointer instrument, in particular in a motor vehicle, including a central indicating unit arranged on a fastening column. The fastening column is arranged outside of the center of the indicating unit, an indicating surface concentrically surrounding the indicating unit, and a centrally supported first pointer for visibly pivoting over the indicating surface. The indicating unit is arranged in front of the pointer and outside of the view of the observer. A second pointer, which has an opening for surrounding the fastening column, is arranged concentrically to the first pointer.

15 Claims, 3 Drawing Sheets

(58) Field of Classification Search
USPC ....... 116/286, 287, 300, 301, 288, 328, 329, 116/331, 332
See application file for complete search history.

(56) References Cited

U.S. PATENT DOCUMENTS

| | | | |
|---|---|---|---|
| 9,182,254 B2 * | 11/2015 | Denise | .................... B60K 35/00 |
| 2007/0157869 A1 | 7/2007 | Kenichi | |
| 2008/0202408 A1 | 8/2008 | Takato | |
| 2012/0206251 A1 | 8/2012 | Birman et al. | |

FOREIGN PATENT DOCUMENTS

| | | | | |
|---|---|---|---|---|
| DE | 10302386 | | 8/2004 | |
| DE | 102004052893 A1 * | | 5/2006 | ............. B60K 37/02 |
| DE | 60114129 | | 6/2006 | |
| DE | 102010001050 A1 * | | 7/2011 | ............. B60K 37/02 |
| EP | 1 880 890 | | 1/2008 | |
| FR | 2 850 163 | | 7/2004 | |
| GB | 2 470 202 | | 11/2010 | |
| JP | 56027611 A * | | 3/1981 | ............... G01D 7/02 |
| JP | 2004 219210 | | 8/2004 | |

* cited by examiner

POINTER INSTRUMENT HAVING A DOUBLE POINTER AND AN ECCENTRICALLY ARRANGED FASTENING COLUMN

CROSS REFERENCE TO RELATED APPLICATIONS

This is a U.S. national stage of application No. PCT/EP2014/071803 filed on Oct. 10, 2014. Priority is claimed on German Application No. DE 10 2013 220 510.4 filed Oct. 11, 2013 and DE 10 2014 200 367.9 filed Jan. 10, 2014, the content of all of which are incorporated here by reference.

BACKGROUND OF THE INVENTION

1. Field of the Invention

The invention relates to a pointer instrument, in particular in a motor vehicle, with a central indicating unit arranged on a fastening column. The fastening column is arranged outside of the center of the indicating unit, with an indicating surface concentrically surrounding the indicating unit, and with a centrally supported first pointer for visibly pivoting over the indicating surface. The indicating unit is arranged in front of the pointer from the viewpoint of the observer.

2. Description of the Prior Art

In pointer instruments of this kind, the central indicating unit is a display for indicating a very wide variety of information, combined with an indicating surface surrounding the display. The annular indicating surface has a scale across which the pointer sweeps. On account of the fastening column for the display that serves to support and contact the display, the centrally supported pointer can be pivoted only through an angle range of approximately 300°. It is thus not possible for the entire indicating surface to be utilized for pointer-based presentation of information.

SUMMARY OF THE INVENTION

An aspect of the invention is to make available a pointer instrument in which the entire indicating surface can be utilized for pointer-based presentation of information.

According to one aspect of the invention, a second pointer, which has a recess for surrounding the fastening column, is arranged concentrically with respect to the first pointer.

With the arrangement of a second pointer, the indicating surface can be utilized to present information over an angle range of 360°. This is achieved by the recess of the second pointer. In this way, the visible pointer tip can also cover the angle range which, because of the arrangement of the fastening column for the display, would not be achievable with a normal pointer design. The recess is in this case the free area of the pointer which, with respect to the radius, is located at the height of the at least one web. The special pointer design with a recess entails low expenditure, such that the pointer instrument according to the invention can be produced relatively inexpensively.

In one embodiment, the recess is formed by a ring segment which is connected to a pointer bushing by a web. In this configuration, the ring segment has a greater distance from the center than the fastening column, as a result of which the ring segment can also be moved in the angle range in which the fastening column is located. The ring segment is connected via a web to the pointer bushing for driving the pointer. In this embodiment, the recess extends from one side of the web to the other side and, therefore, through almost 360°.

Depending on the choice of material and on the geometric configuration, further advantageous embodiments are possible in which, in addition to the one web, further webs can be provided, preferably one to two further webs. The arrangement of the webs serves to increase the stability of the pointer. In these embodiments, the recesses are the free areas delimited by two webs.

A high level of stability of the pointer is achieved with a ring segment that extends through 360°. Such a pointer has particular dimensional stability.

The stability of such a pointer can be further increased by providing one to three webs in addition to the first web.

The smooth running in the movement of the pointer is increased by the webs being arranged on that half of the ring segment directed away from the pointer tip. With such an arrangement, the position of the center of gravity can be actively influenced and ideally shifted to the area of the pointer bushing.

It is generally preferable for the pointer tip to be arranged symmetrically on the ring segment with respect to the webs. If the spatial conditions dictate a departure from a symmetrical arrangement, the pointer tip is to be arranged such that the imbalance caused is not too great.

An imbalance caused as a result of an asymmetrical arrangement of the pointer tip can be compensated if corresponding areas of the ring segment are configured with other dimensions. In the simplest case, all the areas of the ring segment have the same cross section and thus the same dimensions. By strengthening corresponding areas, preferably by a greater cross section, in particular a thicker web, these areas have a greater mass, which in turn serves to compensate for imbalances caused by the arrangement.

According to one embodiment, a lower weight of the pointer, together with less installation space being required, is achieved by the fact that the ring segment extends through an angle range of 180°.

Advantageously, a pointer of this kind has two webs for connecting the ring segment to the pointer bushing, wherein the webs are each arranged on the ends of the ring segment. Such a pointer is distinguished by a high level of stability.

To further reduce the weight of the pointer, it helps if the ring segment extends through an angle range of 90°. Such a pointer runs particularly smoothly. One web is sufficient for such a pointer. The arrangement of two webs has proven advantageous in cases where high demands are placed on dimensional stability and strength.

According to one embodiment, an enlarged recess in a pointer with a ring segment of 90° is achieved if the webs do not extend radially and thus rectilinearly, but instead are curved.

In one embodiment, depending on the field of use, the ring segment can also extend over angle ranges other than those mentioned above.

To increase the stability of the pointer, particularly when using one web the preferable web has a cross-sectional profile deviating from a rectangular or round profile, in particular if it has an L-shaped profile or T-shaped profile.

If the ring segment is arranged to be hidden behind the indicating unit from the viewpoint of the observer, it is ensured that only the pointer tip can be perceived by the observer.

The pointer can be easily produced if the ring segment is formed in one piece with the pointer bushing, preferably from metal or plastic. While the production from metal permits a particularly stable design, the production from plastic permits pointers that are particularly light in weight.

To produce the ring segment with the web from metal, and if appropriate also the pointer bushing, in an advantageous embodiment the pointer tip is formed as a separate component, connected to the ring segment. This permits the use of different materials for the pointer tip and for the rest of the pointer. In this way, the pointer tip and the rest of the pointer can be adapted optimally to their respective tasks. This permits the use of plastic, in particular PC polycarbonate) or PMMA (polymethyl methacrylate), as an illuminatable material for the pointer tip, which can be done independently of the choice of material for the rest of the pointer.

A short light-guiding path for illumination of the pointer tip is achieved by the fact that the pointer tip, in the area of the ring segment, has a coupling-in surface, that a coupling-out surface of a light-guiding element is arranged opposite the coupling-in surface, wherein the coupling-out surface extends along the trajectory of the coupling-in surface, and that the light-guiding element has at least one coupling-in surface for light from at least one light source, such that the light from the light source can be guided by the light-guiding element into the pointer tip in order to illuminate the latter.

BRIEF DESCRIPTION OF THE DRAWINGS

The invention is explained in more detail on the basis of several illustrative embodiments. In the drawing.

DETAILED DESCRIPTION OF THE PRESENTLY PREFERRED EMBODIMENTS

Figure 1:
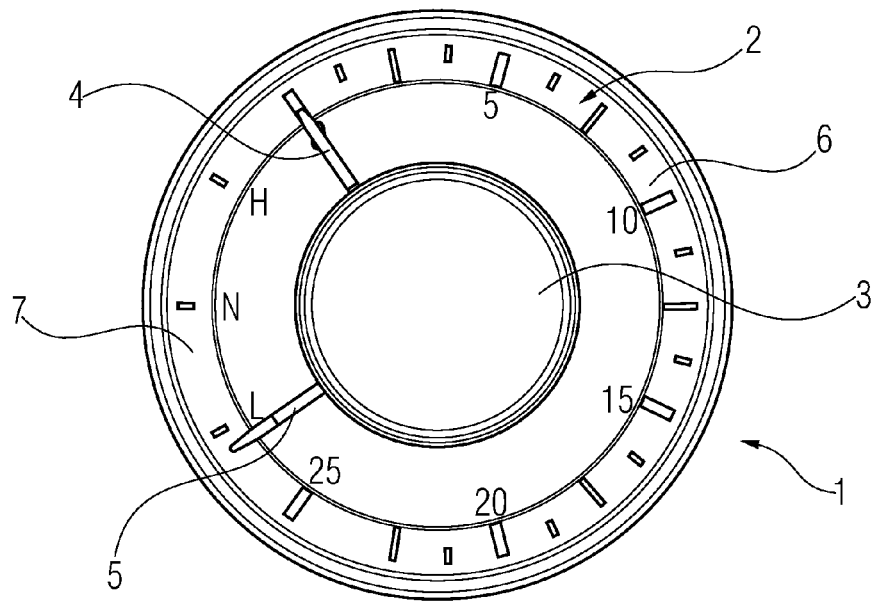
FIG. 1 is a pointer instrument from the viewpoint of an observer.

FIG. 1 shows a pointer instrument 1 with an annular indicating surface 2, for use in a motor vehicle. At the center of the annular indicating surface 2, a display 3 is arranged as a central indicating unit, such that the indicating surface 2 concentrically surrounds the display 3. A first, centrally supported pointer 4 is arranged for visible pivoting across the indicating surface 2. The display 3 is arranged in front of the first pointer 4 from the viewpoint of the observer. In addition, a second pointer 5 is also arranged centrally behind the display 3. The pointer tip 14 of the second pointer 5 is designed, analogously to the first pointer, for visibly pivoting across the indicating surface 2. The indicating surface 2 has two scales 6, 7. In this example, the first scale 6 is from "0" to "25" and extends through 270° of the indicating surface 2. The first pointer 4 is arranged such that it is pivotable across the area from "0" to "25". The second scale 7 is from "H" to "L" and extends through almost 90° of the indicating surface 2. The second pointer 5 is designed such that it is pivotable across this area. The indicating surface 2 is thus utilized across its entire extent for the presentation of information, since both pointers 4, 5 together are pivotable through an angle range of 360°.

Figure 2:
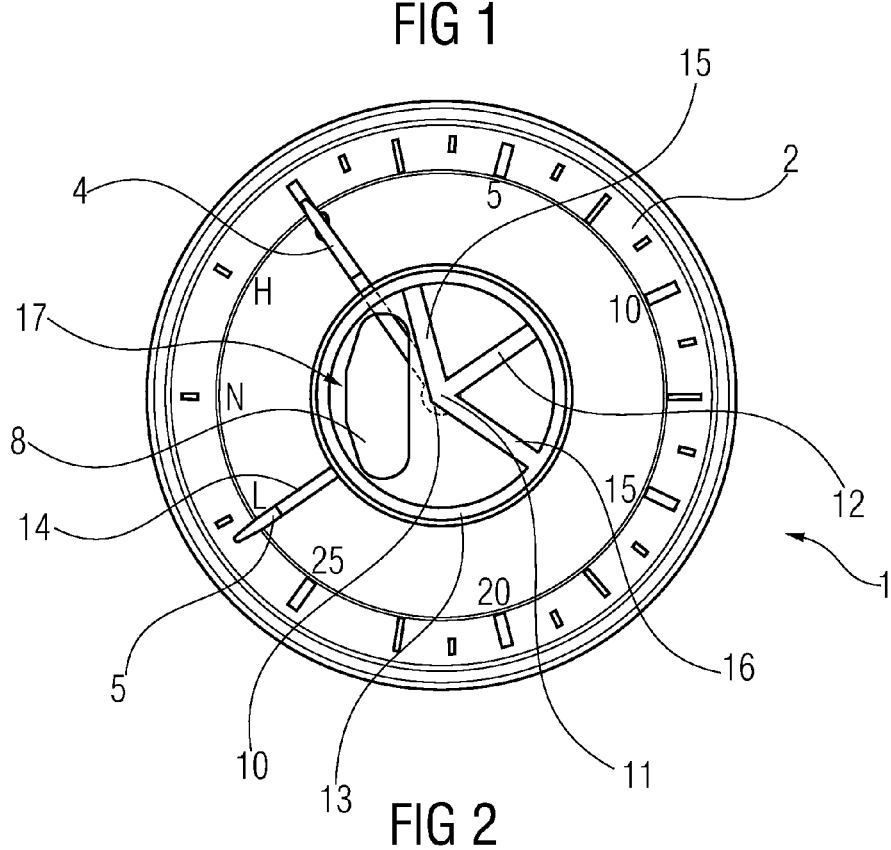
FIG. 2 is the pointer instrument according to FIG. 1.

FIG. 2 shows the pointer instrument 1 with the circular indicating surface 2 without display 3. Only the fastening column 8, with which the display is supported on a carrier of the indicating instrument 1, is shown. The first pointer 4 is rectilinear and is mounted rotatably with its pointer bushing 10 at the center. The second pointer 5 has a pointer bushing 11 arranged inside the pointer bushing 10 of the first pointer 4. A web 12 extends radially outward from the pointer bushing 11 as far as a ring segment 13, which extends through 360°. A pointer tip 14 is secured on that side of the ring segment 13 lying opposite the web 12. As a result of this arrangement, the center of gravity of the pointer 5 lies in the area of the pointer bushing 11. To increase the stability of the pointer 5, two further webs 15, 16 are arranged with respect to both sides of the first web 12, symmetrically with respect to the web 12. The two webs 15, 16 form, with the ring segment 13, a recess 17, wherein the ring segment 13 and the two webs 15, 16 are designed such that, when the second pointer 5 pivots across the second scale 7, the fastening column 8 of the display is not touched. The first pointer 4 is likewise pivoted clockwise, such that an angle range of 360° of the indicating surface 2 is covered by the pointers in this configuration.

FIGS. 3a-e show the two pointers 4, 5 and the fastening column 8. In the view shown, the first pointer 4 is between "5" and "10" on the indicating surface 2, while the second pointer 5 is at "H". In all of the views, the second pointer 5 consists of the pointer bushing 11 with the first web 12, which in turn is connected to the ring segment 13 and to the pointer tip 14 secured thereon. The pointer 5 in FIG. 3a corresponds to the pointer 5 in FIG. 2.

Figure 3A:
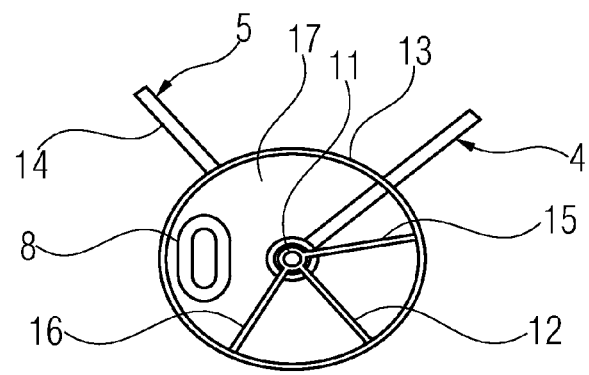
FIGS. 3a-e are further embodiments of the pointers.
Figure 3B:
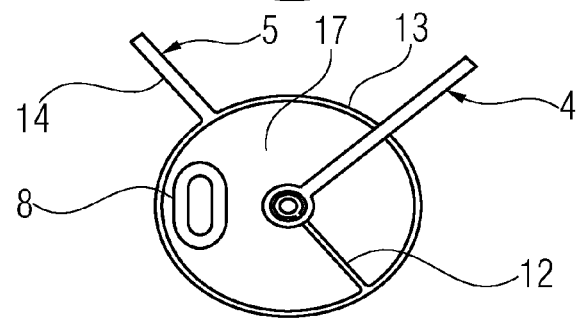

The pointer 5 in FIG. 3b has only one web 12. A pointer with a particularly simple structure of this kind has sufficient stability, for example through a suitable geometric configuration in terms of thickness and cross section or through the choice of material, preferably metal. The recess 17 has its greatest extent in this embodiment, permitting a range of pivoting of the second pointer 5 of almost 270° depending on the size of the fastening column 8. In this way, the scale assigned to the second pointer 5 can be formed across a much greater angle range, which improves readability and/or permits a finer graduation of the scale.

Figure 3C:
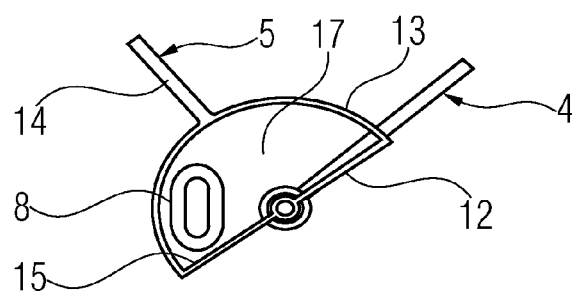

In FIG. 3c, the ring segment 13 extends through an angle range of 180°. The two ends of the ring segment 13 are connected to the pointer bushing 11 by a respective web 12, 15. In this embodiment, the pointer tip 14 is secured on the ring segment 13 at a 90° offset from the web 12. The recess 17 is surrounded by the ring segment 13 and by the webs 12, 15.

Figure 3D:
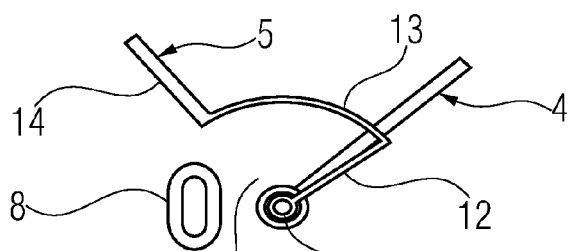

The ring segment 13 in FIG. 3d extends through 90° and, at one end, is connected to the pointer bushing 11 by the web 12. The pointer tip 14 is secured on the other end of the ring segment 13. Web 12 and ring segment 13 thus form an open recess 17. The open recess 17 thus allows the pointer 5 to pivot across an angle range greater than the angle range of the ring segment 13.

Figure 3E:
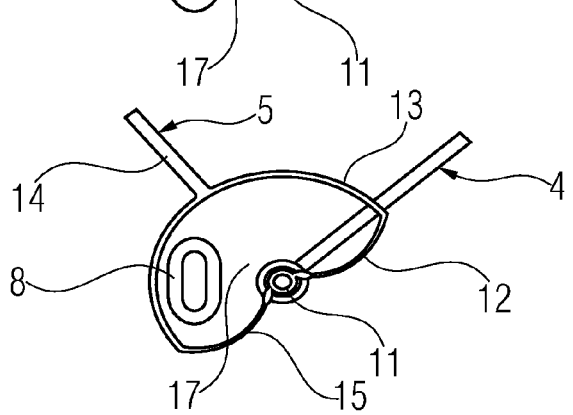

The pointer 5 in FIG. 3e is a modification after FIG. 3c, the webs 12, 15 being curved outward. As a result of the curvature, the recess 17 is enlarged, which permits a greater range of pivoting of the pointer 5.

Figure 4:
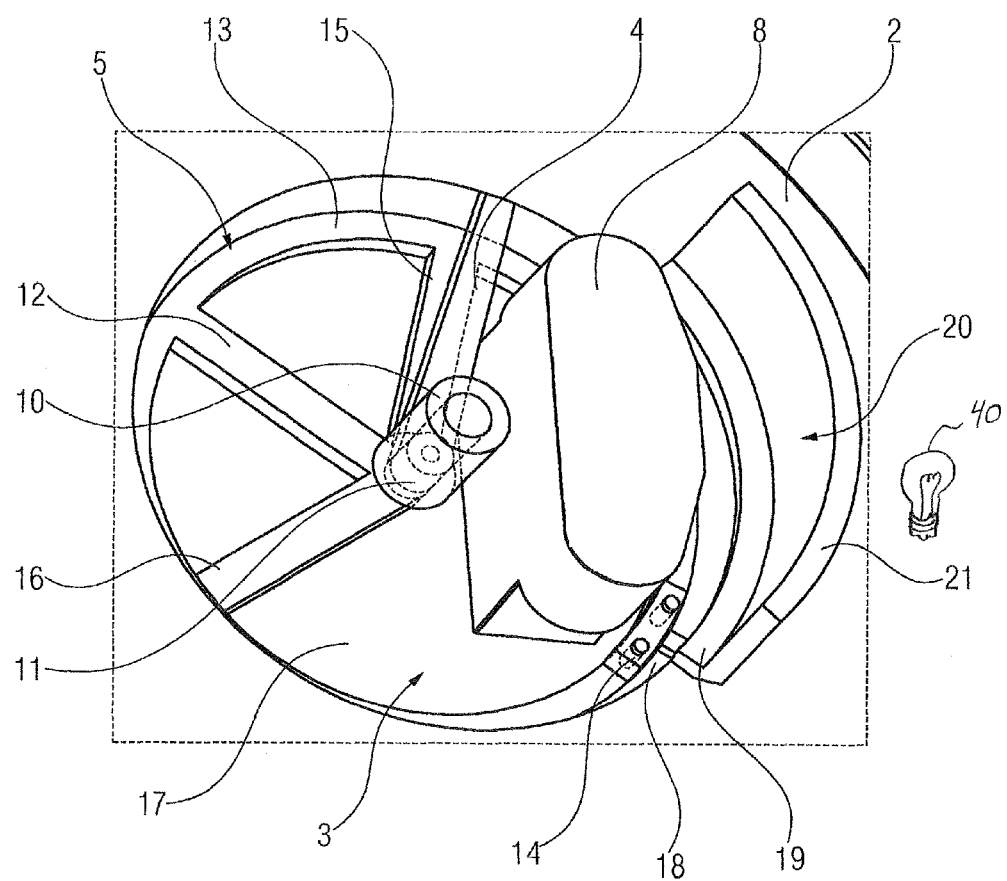
FIG. 4 is a rear of the pointer instrument from FIG. 1.

FIG. 4 shows the rear of the indicating surface 2, the display 3 with its fastening column 8, and the pointers 4, 5 arranged in front of display 3. The fastening column 8 is guided through the recess 17 of the pointer 5. The recess 17 is formed by the webs 15, 16 and the ring segment 13. On the side of the ring segment 13, lying opposite the web 12, the pointer tip 14 is connected directly to the ring segment 13. In this area, the pointer tip 14 has a coupling-in surface 18 for light. A coupling-out surface 19 of a light-guiding element 20 is arranged opposite the coupling-in surface 18. The light-guiding element 20 extends with its coupling-out surface 19 along the trajectory of the coupling-in surface 18 of the pointer tip 14. The light-guiding element 20 moreover has a coupling-in surface 21 for light from at least one light source 40, such that the light from the light source can be guided by the light-guiding element 20 into the pointer tip 14 in order to illuminate the latter.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A pointer instrument comprising:
   a central indicating unit;
   a fastening column on which the central indicating unit is arranged, wherein the fastening column is arranged outside of a center of the central indicating unit;
   an indicating surface concentrically surrounding the indicating unit;
   a centrally supported first pointer configured to visibly pivot over the indicating surface, wherein the central indicating unit is arranged in front of the centrally supported first pointer from a viewpoint of an observer; and
   a second pointer is arranged concentrically with respect to the first pointer and defines a recess that surrounds the fastening column,
   wherein the recess is formed by a ring segment connected to a pointer bushing by at least one web.

2. The pointer instrument as claimed in claim 1, wherein the ring segment extends through 360°.

3. The pointer instrument as claimed in claim 1, wherein the ring segment extends through 180°.

4. The pointer instrument as claimed in claim 1, wherein the ring segment extends through 90°.

5. The pointer instrument as claimed in claim 1, wherein the ring segment is arranged behind the indicating unit from the viewpoint of the observer.

6. The pointer instrument as claimed in claim 5, wherein the ring segment is hidden by the indicating unit from the viewpoint of the observer.

7. The pointer instrument as claimed in claim 1, wherein the ring segment is formed in one piece with the pointer bushing.

8. The pointer instrument as claimed in claim 7, wherein the ring segment is formed in one piece with the pointer bushing from metal or plastic.

9. The pointer instrument as claimed in claim 1, wherein a pointer tip of the second pointer is connected to the ring segment.

10. The pointer instrument as claimed in claim 9, wherein the pointer tip is made from a light-guiding material.

11. The pointer instrument as claimed in claim 10, wherein the pointer tip comprises:
    a coupling-in surface on a side directed toward the ring segment,
    a coupling-out surface of a light-guiding element is arranged opposite the coupling-in surface,
    wherein the coupling-out surface extends along a trajectory of the coupling-in surface, and
    the light-guiding element has at least one coupling-in surface configured to receive light from at least one light source, such that the light from the light source can be guided by the light-guiding element into the pointer tip to illuminate the latter.

12. The pointer instrument as claimed in claim 9, wherein the pointer tip is made from a plastic.

13. The pointer instrument as claimed in claim 12, wherein the plastic is PC or PMMA.

14. The pointer instrument as claimed in claim 1, wherein the ring segment is connected to a pointer bushing by at least two webs.

15. The pointer instrument as claimed in claim 1, wherein the ring segment is connected to a pointer bushing by at least three webs.

* * * * *